United States Patent [19]
Goisis et al.

[11] Patent Number: 6,063,183
[45] Date of Patent: May 16, 2000

[54] SUPERFLUIDIFYING COMPOSITION FOR CEMENT COMPOSITIONS

[75] Inventors: Marco Goisis, Bergamo; Luigi Cassar, San Donato Milanese, both of Italy

[73] Assignee: Italcementi S.p.A., Bergamo, Italy

[21] Appl. No.: 09/108,760

[22] PCT Filed: Jan. 2, 1997

[86] PCT No.: PCT/EP97/00026
§ 371 Date: Sep. 22, 1998
§ 102(e) Date: Sep. 22, 1998

[87] PCT Pub. No.: WO97/25290
PCT Pub. Date: Jul. 17, 1997

[30] Foreign Application Priority Data

Jan. 3, 1996 [IT] Italy .................................. MI96A0005

[51] Int. Cl.$^7$ ........................... C04B 24/20; C04B 24/32; C04B 28/02
[52] U.S. Cl. ........................... 106/725; 106/696; 106/808; 106/809; 106/823
[58] Field of Search ..................................... 106/725, 808, 106/809, 823, 696

[56] References Cited

U.S. PATENT DOCUMENTS

| 4,964,014 | 10/1990 | Jeschke et al. | 510/376 |
| 5,221,344 | 6/1993 | Prevedello et al. | 106/807 |
| 5,466,289 | 11/1995 | Yonezawa et al. | 106/809 |

FOREIGN PATENT DOCUMENTS

| 2159536 | 12/1985 | United Kingdom . |
| 9103536 | 3/1991 | WIPO . |

*Primary Examiner*—Anthony Green
*Attorney, Agent, or Firm*—Hedman, Gibson & Costigan, P.C.

[57] ABSTRACT

A superfluidifying composition for cement compositions is described, which contains as superfluidifying additive a salt of the product resulting from sulfonation and oxidation of fuel oils deriving from steam cracking of oil products (FOKS), and an antifoam additive comprising one or more copolymers among ethylene oxide and propylene oxide, etherified at the beginning of the polymeric chain by an alkoxy group $R_1$—O, wherein $R_1$ is an alkyl group, linear or branched, having from 2 to 20 carbon atoms, and whose monomeric terminal units have their oxygen atom bound to a hydrogen atom.

33 Claims, No Drawings

SUPERFLUIDIFYING COMPOSITION FOR CEMENT COMPOSITIONS

FIELD OF THE INVENTION

The present invention relates to a superfluidifying composition for cement mixes containing a superfluidifying additive combined with an antifoam additive.

It is known in the art the use of additives to improve the quality of the concrete, to facilitate its use and to reduce the relative laying costs. The categories of additives of widespread use are represented by accelerators and driers, retarders, by fluidifying and superfluidifying agents and by air-entraining agents.

The superfluidifying agents have a fundamental importance as they allow to improve the concrete workability keeping constant the water/cement ratio or alternately to reduce such a ratio without penalizing the workability of the material.

In the first applicative form the superfluidifying agents allow to prepare fluid concretes reducing the laying and casting compaction costs; in such a case, the resistance and durability characteristics of the material remain practically unaltered. In the second one, the superfluidifying agents allow to increase the mechanical resistances decreasing the mixing water amount and leaving unaltered the cement dosage.

PRIOR ART

The superfluidifying agents are generally classified in four groups, that is the condensates sulfonate melamine- formaldehyde (SMF), the condensates naphthalenesulfonate-formaldehyde (NSF), the modified lignosulfonates (MLS) and a last one including sulfonic acids esters, carbohydrates esters, etc.

In addition to the traditional kind superfluidifying additives mentioned above, in the last years alternative compounds have been studied which beside having good fluidization properties of the cement mixes are characterized by an easier and cheaper preparation process, such as the "Fuel Oil Cracking Sulfonated" (FOKS), which are cheaper products in particular than the NSF.

The FOKS preparation and their use as superfluidifying additives for cement mixes is described in the European Patent Application EP 341,791.

The cement compositions according to EP 341,791 added with alcohol type antifoam agents show compressive strength values comprised between 392 and 488 Kg/cm$^2$ after 28 days setting.

According to JP 6019044 polyoxyethylene and polyoxypropylene block copolymer is used as foam-extinguishing agent to prepare a cellulose based composition, that has a levelling efficacy for cement paste and mortar.

U.S. Pat. No. 5,466,289 discloses ultra-high strengh hydraulic cement compositions comprising specific vinyl copolymers as dispersion agent and an antifoam agent, which includes preferably polyoxyethylene and polyoxypropylene block copolymers.

In particular the FOKS is an (alkaline, alkaline-earth or ammonium, preferably sodium) salt of the sulfonated and oxidised product resulting from the reaction between sulphuric anhydride and fuel oils deriving from the steam cracking of oil products.

In the present text, FOKS and the preparation process thereof are as defined in patent application EP 341,791, or in the corresponding U.S. Pat. No. 5,221,344, or in UK application GB 2,159,536, which are herein incorporated by reference, but they may be also obtained according to a slightly modified procedure, as hereinafter described in the present application.

Fuel oils deriving from steam cracking correspond in particular to the residual hydrocarbon fraction in the production of ethylene and other lower hydrocarbons by pyrolysis of naphtha and gas oil.

Such hydrocarbon fraction has a high aromatic compounds content, and at least 50% by weight of such aromatic compounds are represented by aromatic compounds having polycyclic or bicyclic condensed rings in accordance with the ASTM D 3239-91 standards. The FOKS, according to what has been reported in the Patent EP 341 791, are employable as superfluidifying agents in concretes, optionally in the presence of siliconic kind antifoam agents or of alcohols or fatty acids derivatives, in amounts to 10% by weight with respect to the FOKS. The Patent Application WO-A-91/03536 describes antifoam additives for detergents consisting of mixtures of polyethylene glycols and ethylene oxide-propylene oxide block copolymers alkoxylated by C8–C18 alkoxylic residues, containing from 2 to 6 residues derived from ethylene oxide and from 3 to 7 residues derived from propylene oxide.

U.S. Pat. No. 4,965,014 (CA Abstract) describes RO—(EO)$_m$—(PPO)$_n$H copolymers, containing m=1, 2 EO monomeric units derived from ethylene oxide and n=6–8 PPO monomeric units derived from propylene oxide, for use as non ionic surfactant agents in wetting, detergent agents and dispersing compositions.

TECHNICAL PROBLEM

It has been observed by the Applicant that the antifoam agents are an essential aspect for the formulation of an optimal superfluidifying composition containing FOKS, and that not every antifoam compound known in the art gives efficacious results in the cement mixes.

In particular, in the absence of a suitable antifoam agent, the cement mixes added with FOKS show high air contents, and this fact negatively affects the mechanical resistance of the cement product. In particular, in normal mortars containing 0.60% by weight of FOKS (expressed as active part) with respect to the cement weight, included air contents ranging from 10 to 28% by volume have been found.

When the FOKS are associated with antifoam additives already known for the reduction of the porosity of the concretes, such as the silicon based antifoams cited in EP-A-341 791, a poor or in any case inadequate reduction of the included air amount is obtained and an inadequate improvement of mechanical resistance of the cement manufactured article.

The problem which the present invention intends to solve is to determine a suitable additive able to reduce within acceptable levels air content present in the cement mix added with FOKS, improving the mechanical resistance of the cement manufactures thus prepared.

SUMMARY

The Applicant has surprisingly found that a formulation based on a copolymer among ethylene oxide monomeric units and propylene oxide monomeric units, etherified at the beginning of the polymeric chains by an alkoxylic residue is particularly effective in reducing the air included into the cement compositions added with FOKS, and it improves the mechanical resistance of the relative manufactured articles.

In the present text the copolymer structure is defined naming the monomers used for its preparation.

The copolymers used for the realization of the present invention thus contain, and typically consist of, one or more —[—$CH_2CH_2$—O—]— monomeric units derived from ethylene oxide by opening of the relative ring, indicated in the present text by EO, and one or more —[—$CH(CH_3)CH_2$—O—]— or —[—$CH_2CH(CH_3)$—O—]— monomeric units derived from propylene oxide by opening of the relative ring, indicated in the present text by PPO.

Typically, polymeric chains are etherified at the beginning of the chain by a $R_1O$— residue as defined above, which is bound by an ethereal bond between its oxygen atom and the carbon atom of the first monomeric unit of the polymeric chain, which may indifferently be an EO or PPO unit.

Typically, the copolymer is an open chain one, that is it shows terminal EO or PPO units having free hydroxyl group, that is EO or PPO units whose oxygen atom is bound to a hydrogen atom.

Accordingly, polymeric chains typically comprise $R_1O$—(EO)— or $R_1O$—(PPO)— units as initial units, and —(EO)—H or —(PPO)—H units as terminal units, the remaining units typically consisting of EO and PPO units.

Given a certain $R_1O$— residue, the EO and PPO units are present in a number such that they give the desired molecular weight.

It is therefore an object of the present invention a superfluidifying composition for cement compositions comprising a superfluidifying additive and an antifoam additive, wherein the superfluidifying additive is the salification product, in the form of an alkaline metal, alkaline-earth metal or ammonium salt, of the sulfonated and oxidised product resulting from the reaction between sulphuric anhydride and fuel oils deriving from steam cracking of oil products (FOKS), characterized in that the antifoam additive is based on at least one copolymer of ethylene oxide and propylene oxide, wherein polymeric chains comprise, and typically essentially consist of, one or more (EO)—[—$CH_2CH_2$—O]— monomeric units and one or more (PPO) monomeric units selected from the group consisting of —[—$CH(CH_3)CH_2$—O—]—, —[—$CH_2CH(CH_3)$—O—]— and mixtures thereof, and wherein the polymeric chains are etherified at their beginning by a $R_1O$— alkoxy group, wherein $R_1$ is a linear or branched alkyl group, having from 2 to 20 carbon atoms, and have the oxygen atoms of their terminal monomeric units bound to hydrogen atoms. $R_1$ may be if necessary represented by a mixture of linear or branched alkyl groups, having from 2 to 20 carbon atoms.

A further object of the present invention is a cement composition comprising cement (or other hydraulic binder), water, and optionally aggregates, in combination with the above described superfluidifying composition, and the relative preparation process.

DETAILED DESCRIPTION

In the present text by the term "cement mix" or "cement composition" we mean a mixture of cement (or other hydraulic binder) and water, optionally containing aggregates of various granulometry, whereas "cement" is the hydraulic binder as dry component.

Thus the definition comprises both cement pastes, and conglomerates, such as mortars and concretes.

By the term cement pastes we mean cement and water based, aggregate free, mixes; the conglomerates are cement compositions essentially comprising mixes of water, cement and aggregates (sand, gravel, crushed stones). The mortars are in particular mixes of water, cement and fine aggregate. The concretes are mixes of water, cement, fine aggregate and raw aggregate.

For the purposes of the present invention the term "hydraulic binder" concerns all the cement compositions able to harden and to set by water action, and comprises any kind of cement, both the so called normal cements according to the European prestandard ENV 197.1 (cements of I, II, III, IV and V type), that is the ordinary Portland cement and any mixture cement (such as pozzolan, composite and slag cement), as well as other cements such as the aluminate cement, those ones for debris dam or the special ones, for example those having low hydration heat, or sulfate resistant ones.

Type II cement (Portland composite), type IV cements (pozzolan) and type I cements (Portland) are those more commonly used.

By the term "aggregate" or "inert" we mean to comprise both the raw aggregates, such as crushed stones or gravel, and fine aggregates such as sand or other aggregates which are comprised in the ASTM No. C-33 standard.

The proportion of the various kinds of aggregates is a function of the properties and the final uses of the desired mortars and concretes. The aggregate amount may be up to 80% by weight with respect to the total weight of the wet cement mix, preferably between 20% and 80% by weight, referred to dry components.

In the conglomerates exemplified in the present Patent Application such amount ranges from 60% and 80% by weight (67% for the mortars and 78% for the concretes).

The water amount used in the cement compositions is that one sufficient to complete the hydration reaction of the cement and to provide the optimal workability at the plastic state of the mixture. In general terms the water amount ranges from about 8% to 30% by weight with respect to the total weight of the wet cement mix in the mortars, and from 5% to 80% by weight for the concretes. In the conglomerates exemplified in the present Patent Application it is 5–15% by weight.

In addition to the essential components indicated above (hydraulic binder, water, aggregates, FOKS and antifoam additive), the cement compositions according to the present invention may optionally contain other additives having various structure and function.

As remembered above, copolymers of ethylene oxide and propylene oxide are known for use as antifoam agents in the detergents field.

It is moreover known a commercial product based on ethylene oxide and propylene oxide copolymers (AIRPLAST®), for use as antifoam agent for cement conglomerates.

The copolymer of ethylene oxide and propylene oxide units used as antifoam additive in the superfluidifying compositions according to the present invention may be prepared according to conventional methods.

In particular, the ethylene oxide and propylene oxide monomers are treated by a suitable $R_1O$— alkoxide, for example in the form of alkaline metal alkoxide, according to procedures analogous to those schematized in KIRK-OTHMER (John Wiley & Son, 1982, Vol. 6, pp. 798–818).

According to a preferred embodiment of the present invention, such copolymer has a molecular weight preferably ranging from 600 and 3000 daltons, with a ratio between PPO and EO units preferably ranging from 1/1 to 10/1, more preferably from 1/1 to 5/1.

The copolymer component of the superfluidifying composition of the present invention may be used as raw product, in the presence of its unreacted or hydrolyzed components, or of lower molecular weight copolymers.

Even if the above mentioned copolymer represents the main component by weight of the antifoam additive, it is thus possible that the copolymer content of the antiform agent is of about 70%–90% by weight and that about 10/30% by weight of the antifoam additive consists of by-products, such as alcohols mixtures, in particular ethylene glycols and/or propylene glycols, resulting from ethylene oxide and or propylene oxide ring opening, and PPO/EO copolymers having low molecular weight (lower than 600 daltons) and optionally of other reaction by-products deriving from copolymerization.

Preferably, $R_1$ is a linear or branched alkyl residue having from 4 to 12 carbon atoms.

In a further preferred aspect, the ratio PPO/EO is 3, and the molecular weight ranges between 900 and 1200 daltons. More particularly, the $R_1$ residue is $CH_3(CH_2)_{12}$—.

Even more preferably, $R_1$ is $CH_3(CH_2)_{12}$—, the ratio PPO/EO is 3, and the molecular weight is about 1050, corresponding to a copolymer containing about 4 EO units and about 12 PPO units.

According to a particularly preferred aspect of the invention the commercial product Airplast® 251 (sold by H. Q. France) is used, which is included in the family of the copolymers defined above. Such product appears as a colourless or slightly yellowish liquid, dispersible in water, having non ionic character, density equal to 0.934±0.005 g/cc (g/ml), pH equal to 9.4±0.5 measured in a 10% volume/volume aqueous solution, freezing point <=−10° C.

In the superfluidifying compositions according to the present invention, the superfluidifying additive and the antifoam one may be present as separate components, or in the form of a mixture (i.e. pre-mixed). Said mixture may if necessary also contain a solvent used in order to facilitate its dissolution (typically water), and it is generally obtained mixing the two additives at the moment of use. As the FOKS, as later on will be seen, is typically recovered from by the reaction mixture in aqueous solution form, the superfluidifying composition may typically be represented by an aqueous solution containing the two additives. When also the antifoam additive is in liquid form, such solution is obtained simply by mixing the two additives.

Generally, in the present superfluidifying compositions the antifoam additive is in an amount of 1–8%, more preferably between 1 and 5.5% by weight with respect to the amount of FOKS.

As the FOKS and the antifoam additive may be used in raw products form, the amount by weight of FOKS is referred to its active part, that is to the content in organic sulfonate product (that is of sulfonated and oxidised organic product as anionic, not salified product), and the amount by weight of copolymer is typically referred to the raw product containing the above mentioned reaction by-products, but may be optionally referred to the isolated and/or purified copolymer.

Typically FOKS is prepared according to a procedure analogous to that described in EP 341781, and in greater detail in GB 2159536, at temperatures even lower than those therein reported, reacting the hydrocarbon fraction represented by the fuel oil with sulphuric anhydride in liquid or gaseous form, with weight ratios sulphuric anhydride/fuel oil typically ranging from 0.5/1 to 2.0/1, preferably from 0.8/1 to 1.2/1, at temperatures ranging from about 60° C. to about 120° C., more preferably from about 60° C. to about 80° C.

The preparation process of the FOKS includes for example the dissolution of the fuel oil in a solvent inert to sulfonation, immiscible or poorly mixable with water (for example an alogenated solvent such carbon tetrachloride, tetrachloroethylene and dichloroethylene); the addition to the solution so obtained of the sulphuric anhydride, in liquid or in gaseous form, followed by reaction at the above defined temperature, while removing the sulphur anhydride forming during the reaction; the cooling and the neutralization of the reaction mixture with an aqueous solution of a base of an alkali metal, of an alkaline-earth metal or ammonium (typically at a pH ranging from 7 to 10); the recovery of the reaction product from the reaction mixture by elimination of the organic solvent (by decantation and/or evaporation) and at least partly of water.

The organic sulfonate may be separated from the reaction mixture in solid form too, but for the purposes of the present invention it may be recovered and directly used as an aqueous solution.

For the purposes of the present invention the FOKS is typically obtained treating with gaseous sulphuric anhydride a fuel oil deriving from steam cracking plants, using a weight ratio sulphuric anhydride/fuel oil typically equal to 1/1, at a reaction temperature ranging from 65° C. to 80° C.

The sulfonation product is neutralized with an alkali metal, alkaline-earth metal or ammonium base, typically sodium hydroxide, then recovered as an aqueous solution.

The so obtained FOKS additive appears as an aqueous solution containing from 10% to 80% by weight of organic product (organic sulfonate), and lower amounts (10–30% by weight) of alkaline, alkaline-earth or ammonium sulfate, and of possible reaction organic residues.

More preferably, such aqueous solution contains from 15% to 20% of organic sulfonate and from 1% to 3% of sodium sulfate or of other alkali, alkaline-earth metal or ammonium sulfate (% being expressed as % by weight).

In the cement compositions according to the present invention the FOKS superfluidifying additive is preferably present in a concentration between 0.3% and 3% by weight with respect to the cement (said percentage is relative to the active part of the FOKS, that is to the content in organic sulfonate) and the antifoam additive is in amount ranging from 1% to 8% by weight with respect to the active part of the FOKS—that is to the content in organic sulfonate.

More preferably, the FOKS superfluidifying additive is in amount equal to 0.3–1% by weight with respect to the cement and the antifoam additive is in amount ranging from 1 and 5.5% by weight with respect to the active part of the FOKS.

The cement compositions according to the present invention are preferably conglomerates, in particular mortars or concretes, and they are prepared mixing the ingredients according to conventional kneading techniques, for example following the addition order of the ingredients and the mixing procedures illustrated in the Examples reported below.

The superfluidifying additive and the antifoam one being part of the superfluidifying composition according to the present invention may be added to the other ingredients of the cement compositions either as separate components, or in mixture form, at any step of the mixing of the ingredients of the cement composition. In particular, the above mentioned additives may be added to one or more of the above mentioned ingredients when these ones are in a dry state, or in a wet state, being partly or completely mixed with the mixing water.

According to a typical embodiment of the present invention the FOKS is mixed with the antifoam agent, optionally with the aid of a solvent, generally water.

According to a typical embodiment of the present invention, the superfluidifying and the antifoam additive which are part of the superfluidifying composition according to the present invention are added, preferably in the form of a previously prepared mixture, to the mixing water before the mixing of the ingredients of the cement composition, generally at the moment of use; then the mixing water is added to the remaining ingredients of the cement composition. As the FOKS, as previously seen, is typically isolated in aqueous solution form, it is typically mixed with the antifoam additive based on copolymer among ethylene oxide and propylene oxide, and the so obtained mixture is diluted with the amount of water needed to form the mixing water.

According to a typical embodiment of the present invention the cement composition is a conglomerate comprising water, cement and aggregates (inerts), with a water/cement ratio for instance comprised between 0.4/1 and 0.7/1 by weight and a cement/aggregates ratio ranging for instance from 1/3 to 1/6 by weight.

In the case of concretes, the granulometric distribution of aggregates for example ranges from 0.125 to 20 mm (diameter of the particles). Typically, the cement is type I Portland cement (the so called pure Portland), or type II cement (composite Portland), and it may have resistance class 42.5–52.5. such as for example the Italcementi CEM I 52.5 or the Italcementi CEM:II/A-L 42.5 (Calusco) cement.

According to a particular embodiment of the present invention, the cement composition is a mortar with a water/cement weight ratio of 0.45–0.55 and cement/aggregate weight ratio of 1/2.5–1/3.5; the FOKS superfluidifying additive is in an amount ranging from 0.3% to 0.5% by weight with respect to the cement and the antifoam additive is in an amount equal to 1%–3% by weight with respect to the active part of the FOKS.

According to another typical embodiment of the present invention, the cement composition is a concrete, having a water/cement ratio 0.5–0.6 and a cement/aggregates ratio ranging from 1/5.0 to 1/5.5; the FOKS superfluidifying additive is in an amount ranging from 0.45% to 0.60% by weight and the antifoam additive is in an amount equal to 4.5–5.5% by weight with respect to the active part of the FOKS.

Typically, the cement composition according to the present invention have an included air content below 10%, preferably up to about 5%, expressed as the volume % of the cement sample which is constituted by pores, measured according to ASTM C 185-85 standard and successive modifications. More particularly, included air content is up to about 4–5% by volume for the present mortars, and up to 1–2% by volume for the present concretes.

Resistance to compression (i.e. compression strenght) of the cement compositions according to the present invention is for instance of at least 15 Mpa (e.g. 15–20 Mpa), measured 1 day after setting, both for mortars and for concretes, being measured according to EN 196/1 standard.

Furthermore, in the case of present mortars, compression strength values may be for instance of at least about 40 Mpa (e.g. 40–45 Mpa) when measured 7 days after setting, and of at least 50 Mpa (e.g. 50–55 Mpa) when measured 28 days after setting, whereas in the case of concretes compression strenght values may be for instance of at least about 35 Mpa (e.g. 35–40 Mpa) when measured 7 days after setting, and of at least 40 Mpa (e.g. 40–45 Mpa) when measured 28 days after setting.

The present cement compositions are also endowed with good fluidity, showing consistency values of at least about 120, measured according to UNI 7044 standard.

Some Examples are reported below with the aim to illustrate, without limiting, the present invention.

EXAMPLE 1

Preparation of the FOKS

The FOKS have been prepared by sulfonating with sulphuric anhydride fuel oil coming from "steam cracking" plants, according to a procedure analogous to that described in EP 341 791.

Adopting sulphuric anhydride/fuel oil ratios equal to 1/1 (weight/weight) and reaction temperatures equal to 65° C. and 80° C., two different samples of FOKS, named A and B (Table 1) have been prepared.

TABLE 1

| Synthesis conditions of FOKS A, B | | |
|---|---|---|
| Synthesis conditions | FOKS A | FOKS B |
| $SO_3$/oil (w/w) | 1 | 1 |
| T (° C.) | 80° C. | 65° C. |

The composition of the resulting FOKS samples is reported in Table 2.

TABLE 2

| Compositions of the synthesized FOKS | | |
|---|---|---|
| Components (% by weight) | FOKS A | FOKS B |
| Organic Sulfonate | 16.2 | 16.3 |
| Sodium Sulfate | 2.3 | 2.8 |
| Water | 81.5 | 80.9 |
| TOTAL | 100.0 | 100.0 |

Air included by cement mortars added with FOKS A
The following samples were prepared:
  2 cement mortars added respectively with FOKS A and B prepared as described in the Example 1, in an amount of 0.60% by weight of active part with respect to the cement;
and for comparison purposes:
  1 cement mortar added with a commercial naphthalenesulfonate-formaldehyde (NSF) based superfluidifying agent.

The cement mortar has been prepared by mixing with an electric mixer (equipped with a blade having rotatory movement around its axis and planetary movement with respect to the container axis—having the two motions in a opposite sense) one part of cement (CEM I 52.5, Italcementi), three parts of CEN normalized sand as defined in the EN 196 standard, 1st part, and half a part of water. Each mix has been prepared with 450 g of cement, 1350 g of sand and 225 g of water. The mixing of the mortar has been carried out according to the procedure described in the EN 196 standard, 1st part.

The FOKS has been added to the mixing water before the preparation of the mortar. The formulations including an antifoam additive have been prepared mixing this component with the FOKS in a manual way. In the dosage of the mixing water, the FOKS has been considered integral part of the same. The Table 3 refers to a mortar thus comprising a Portland cement (of type I according to the ENV 197.1 standard), having resistance class equal to 52.5 N/mm², a water/cement weight ratio equal to 0.50 and a sand/cement weight ratio equal to 3.

TABLE 3

| Additive | FOKS A | FOKS B | NSF |
|---|---|---|---|
| Dosage (%) (FOKS active part) | 0.60 | 0.60 | 0.60 |
| Air (% vol.) | 26 | 21 | 6 |

As it can be observed from Table 3, the included air content in mortars added with FOKS (estimated according to the ASTM C 185-85 standard) is high, and is significantly greater with respect to the one which may be found in mortars containing a commercial naphthalenesulfonate. The latter however has the drawback of being a high cost additive.

In order to control the foaming activity of the FOKS within acceptable levels it is therefore required to formulate them with a suitable antifoam agent.

EXAMPLE 3

Effect of different kinds of antifoam agent in mortars added with FOKS A

In order to point out the effect of the antifoam agent selected according to the present invention on the content of air included in cement mortars added with FOKS and in order to compare the result thus obtained with that achievable with other kinds of antifoam agents, the following samples were prepared:

1 cement mortar added with FOKS A prepared as described in the Example 1), and formulated according to the present invention with the AIRPLAST® antifoam (named "AP" in Table 4);

four comparison cement mortars so called:
  one cement mortar free from additives;
  one cement mortar added with FOKS A, free from any antifoam agent;
  one cement mortar added with FOKS A formulated with a commercial tributyl phosphate based antifoam agent (named "TF" in Table 4);
  one cement mortar added with FOKS A formulated with a commercial silicon based antifoam agent (named "SIL" in Table 4).

The mortars have been prepared according to the procedure reported out in the Example 2 using the composite Portland cement having resistance class 42.5, known as CEM II/A-L 42.5 R ITALCEMENTI (Calusco), adopting a water/cement weight ratio equal to 0.5 and a sand/cement weight ratio equal to 3.

The results are reported in Table 4.

TABLE 4

| Mortar | Mortar as such | +FOKS A | +FOKS A and antifoam | | |
|---|---|---|---|---|---|
| | | | AP | TF | SIL |
| Type of antifoam agent | absent | absent | AP | TF | SIL |
| FOKS A Dosage (%) (a.p. with respect to the cement) | — | 0.45 | 0.45 | 0.45 | 0.45 |
| Antifoam dosage (% with respect to FOKS a.p.) | — | — | 2 | 2 | 2 |
| Air (% vol) ASTM C185-85 mod.) | 5 | 17 | 4 | 12 | 16 |
| Consistency (UNI 7044) | 108 | 118 | 125 | 126 | 121 |
| Rc (Mpa) | | | | | |
| 1 day | 15.7 | 12.1 | 17.6 | 14.1 | 10.4 |
| 7 days | 38.5 | 23.9 | 42.6 | 35.5 | 27.3 |
| 28 days | 50.8 | 32.4 | 53.2 | 47.5 | 36.0 | a.p. = active part
R$_C$ = resistance to compression (compression strength)

As it can be observed from the reported data, the formulation of FOKS A with the Airplast® antifoam agent allows the air included into the additived mortars to be reduced to a value very similar to that of mortar as such. The efficacy of the other antifoam agents is instead poor. This can be drawn also from mechanical resistances of the corresponding additived mortars, which are found to be comparable or even greater than those of the mortar as such only in the case of the mix prepared with the superfluidifying composition of the present invention.

The mortar added with the superfluidifying composition according to the present invention shows a decidedly satisfactory fluidity, as proved by the data reported in Table 4, obtained determining the consistency according to the UNI 7044 standards.

EXAMPLE 4

Superfluidifying compositions containing FOKS B and Airplast®

The behaviour of the cement mortars added with the superfluidifying composition object of the present invention which contain FOKS B and Airplast® has been compared with that of a mortar as such and of mortars, containing FOKS B only.

For the preparation of the mortars, cement the CEM II/A-L 42.5 ITALCEMENTI (Calusco) cement was used.

More specifically, the following samples were prepared (according to the procedure reported in the Example 2):

2 cement mortars added with FOKS B prepared as described in the Example 1 and formulated with the Airplast® antifoam agent, each mortar containing a different dosage of superfluidifying composition;

2 comparison cement mortars added with FOKS B free from antifoam, each mortar containing a different dosage of FOKS B additive.

The results are reported in Table 5.

TABLE 5

| Mortar | As such | FOKS B | | | |
|---|---|---|---|---|---|
| FOKS Dosage % (a.p. with respect to the cement) | — | 0.30 | 0.30 | 0.45 | 0.45 |

TABLE 5-continued

| Mortar | As such | | FOKS B | | |
|---|---|---|---|---|---|
| Antifoam A (% on FOKS a.p.) | — | — | 2 | — | 2 |
| Consistency (UNI 7044) | 103 | 117 | 114 | 127 | 121 |
| Air (% vol.) (ASTM C 185-85 modified) | 5 | 11 | 5 | 20 | 4 |
| $R_C$ (Mpa) | | | | | |
| 1 day | 15.8 | 14.4 | 17.2 | 13.8 | 16.7 |
| 7 days | 39.5 | 33.1 | 40.7 | 29.4 | 40.5 |
| 28 days | 51.8 | 41.5 | 50.5 | 34.2 | 52.2 | a.p. = Active Part
$R_C$ = Compression Strength

The analysis of the data shows that the content of air included into the mortars added with the superfluidifying composition of the invention is equal or even lower to that of mortar as such, and that the resistance to compression strengths of the mortars according to the present invention are similar or even greater than those of mortar as such.

The mortars added with the superfluidifying composition according to the present invention show a decidedly satisfactory fluidity, as proved by the data reported in Table 5, obtained determining the consistency according to the UNI 7044 standards.

EXAMPLE 5

Tests on concrete

In order to verify the efficacy in concrete of the superfluidifying composition object of the invention the following samples were prepared:

1 concrete mix added with FOKS B as described in the Example 1 and formulated with the antifoam of the invention (AIRPLAST®);

and for comparison estimates:

1 concrete mix added with FOKS B without antifoam;
1 non additived concrete mix.

The concrete mixes have been prepared using a vertical axis forced mixer having a 50 liter capacity. The following "mix design" has been adopted:

* type II/A-L 42.5 R—Italcementi Calusco cement, dosage at 350 kg/m³
* water/cement weight ratio equal to 0.55
* aggregating agents consisting of 8 fractions having a granulometric range from 0.125 to 20 mm, and granulometric spindle trend optimized according to UNI 7163, with dosage equal to 1850 kg/m³.

In the dosage of the mixing water the FOKS has been considered integral part of the same.

The mix procedure has been so defined:

introduction of the aggregates and of half the mixing water into the mixer;

mixing for 60 seconds stop for 30 seconds with the mixer covered with a length of cloth;

mixing for 30 seconds with the introduction of the cement;

mixing for 30 seconds with the introduction of the remaining half of the mixing water containing FOKS and optionally of the antifoam mixing for 60 seconds for a total of 180 seconds of mixing and 30 seconds of machine stop.

The results are reported in Table 6

TABLE 6

| | Concrete as such | +FOKS B | |
|---|---|---|---|
| Additive dosage (a.p. with respect to the cement, %) | — | 0.53 | 0.53 |
| Antifoam A (% with respect to FOKS a.p.) | — | — | 5 |
| Slump loss (mm) (UNI 9418) | 61 | 182 | 144 |
| Volumetric mass fresh (Kg/m³) | 2379 | 2272 | 2366 |
| Included air (volume %) | 0.50 | 5 | 1.1 |
| $R_C$ (Mpa) | | | |
| 1 day | 17.8 | 16.8 | 20.3 |
| 2 days | 24.6 | 21.1 | 27.2 |
| 7 days | 34.9 | 28.9 | 36.5 |
| 28 days | 43.5 | 35.2 | 44.6 | a.p. = Active Part
$R_C$ = Resistance to Compression Strength

The comparison between the slump loss (cone failure) and resistance to compression strength values exhibited by different concretes confirms the efficacy of the superfluidifying composition according to the present invention.

We claim:

1. Superfluidifying composition for cement compositions, comprising a mixture of:
    (i) a superfluidifying additive selected from the group consisting of an alkali metal, alkaline earth-metal and ammonium salt, of a sulfonated and oxidized product resulting from reacting sulfuric anhydride with fuel oil derived from steam cracking of oil products (FOKS), and
    (ii) an antifoam additive based on at least one copolymer of ethylene oxide and propylene oxide, comprising one or more ethylene oxide monomeric units comprising —(—CH$_2$CH$_2$—O—) units and one or more propylene oxide monomeric units selected from the group consisting of —(—CH(CH$_3$)CH$_2$—O—)— and —(—CH$_2$CH(CH$_3$)—O—)—, said copolymer further having: (a) an initial unit selected from the group consisting of R$_1$O—(—CH$_2$CH$_2$—O—)—; R$_1$O—(—CH(CH$_3$)CH$_2$—O—)— and R$_1$O—(—CH$_2$CH(CH$_3$)—O—)—, where R$_1$ is a linear or branched alkyl group having from 2 to 20 carbon atoms, and (b) a terminal unit selected from the group consisting of —(CH$_2$CH$_2$—O—)—H, —(CH(CH$_3$)CH$_2$—O—)—H, and —(—CH$_2$CH(CH$_3$)—O—)—H.

2. Superfluidifying composition as claimed in claim 1, wherein the copolymer has a molecular weight ranging from 600 to 3000, and wherein the propylene oxide and ethylene oxide units are present in the copolymer in a ratio ranging from 1/1 to 10/1.

3. Superfluidifying composition as claimed in claim 2, wherein the propylene oxide and ethylene oxide units are present in the copolymer in a ratio ranging from 1/1 to 5/1.

4. Composition as claimed in claim 2, wherein the antifoam additive contains from 10% to 30% by weight of by-products selected from the group consisting of mixtures of alcohols derived from ring opening ethylene oxide, propylene oxide and mixtures thereof, and propylene oxide/ethylene oxide copolymers having a molecular weight lower than 600.

5. Composition as claimed in claim 1, wherein R$_1$, is a linear or branched alkyl residue having from 4 to 14 carbon atoms.

6. Composition as claimed in claim 2 wherein the copolymer has a propylene oxide/ethylene oxide ratio equal to 3, and a molecular weight ranging between 900 and 1200, and $R_1$ is $CH_3(CH_2)_{12}$.

7. Composition as claimed in claim 6, wherein the molecular weight is 1050.

8. Composition as claimed in claim 6, wherein the antifoam additive is a colorless or yellowish liquid, dispersible in water, having an ionic character, density equal to 0.934±0.005 g/cc and pH equal to 9.4±0.5, measured in a 10% volume/volume aqueous solution, freezing point ≦−10° C.

9. Composition as claimed in claim 1, wherein the antifoam additive is present in an amount ranging from 1 to 5.5%.

10. Composition as claimed in claim 1, wherein the FOKS is obtained by reacting a sulfuric anhydride with fuel oil, in a weight ratio ranging from 0.5/1 to 2.0/1, at a temperature ranging from 60° C. to 120° C.

11. Composition as claimed in claim 10, wherein the weight ratio ranges from 0.8/1 to 1.2/1 and the reaction temperature ranges from 60° to 80° C.

12. Composition as claimed in claim 11, wherein said ratio is 1/1, and the reaction temperature ranges from 65° C. to 80° C.

13. Composition as claimed in claim 1, wherein the FOKS is an aqueous solution containing from 10% to 80% by weight of sulfonated and oxidized organic product and from 10 to 30% by weight of alkaline, alkaline-earth or ammonium salt.

14. Composition as claimed in claim 13, wherein the aqueous solution contains from 15% to 20% of organic sulfonate and from 1% to 3% by weight of sodium sulfate or of another alkali, alkaline-earth or ammonium salt.

15. Composition as defined in claim 1, wherein said mixture is an aqueous solution.

16. Cement composition containing cement, water and a superfluidifying composition comprising:
   (i) a superfluidifying additive selected from the group consisting of an alkali metal, alkaline earth-metal and ammonium salt, of a sulfonated and oxidized product resulting from reacting sulfuric anhydride with fuel oil derived from steam cracking of oil products (FOKS), and
   (ii) an antifoam additive based on at least one copolymer of ethylene oxide and propylene oxide, comprising one or more ethylene oxide monomeric units comprising —(—CH$_2$CH$_2$—O—) units and one or more propylene oxide monomeric units selected from the group consisting of —(—CH(CH$_3$)CH$_2$—O—)— and —(—CH$_2$CH(CH$_3$)—O—)—, said copolymer further having: (a) an initial unit selected from the group consisting of R$_1$O—(—CH$_2$CH$_2$—O—)—; R$_1$O—(—CH(CH$_3$)CH$_2$—O—)— and R$_1$O—(—CH$_2$CH(CH$_3$)—O—)—, where R$_1$ is a linear or branched alkyl group having from 2 to 20 carbon atoms, and (b) a terminal unit selected from the group consisting of —(CH$_2$CH$_2$—O—)—H, —(CH(CH$_3$)CH$_2$—O—)—H, and —(—CH$_2$CH(CH$_3$)—O—)—H.

17. Cement composition as claimed in claim 16, wherein the superfluidifying FOKS additive is present in an amount ranging from 0.3% to 3% by weight with respect to the cement, and the antifoam additive is present in an amount ranging from 1% to 8% by weight with respect to the content in sulfonate of the FOKS.

18. Cement composition as claimed in claim 16, further containing aggregates.

19. Cement composition as claimed in claim 18, having a water/cement ratio between 0.4 and 0.7 by weight and a cement/aggregates ratio between 1/3 and 1/6 by weight.

20. Cement composition as claimed in claim 18, wherein the aggregates have a particle diameter ranging from 0.125 mm to 20 mm.

21. Cement composition as claimed in claim 16, wherein the cement is selected from the group consisting of type I Portland cement and type II Portland cement.

22. Cement composition as claimed in claim 16, wherein the cement composition is a mortar.

23. Cement composition as claimed in claim 22, having a water/cement ratio by weight ranging from 0.45–0.55 and a cement/aggregate ratio by weight ranging from 1/2.5–1/3.5; the superfluidifying FOKS additive is present in an amount ranging from 0.3 to 0.5% by weight with respect to the cement and the antifoam additive is present in an amount ranging from 1 to 3% by weight with respect to the FOKS.

24. Cement composition as claimed in claim 16, wherein the cement composition is a concrete, having a water/cement ratio by weight ranging from 0.5 to 0.6 and a cement/aggregates ratio by weight ranging from 1/5.0 to 1/5.5; the superfluidifying FOKS additive is present in an amount ranging from 0.45 to 0.60% by weight and the antifoam additive is present in an amount ranging from 4.5 to 5.5% by weight with respect to the FOKS.

25. Cement composition according to claim 16, having an included air content below 10% by volume.

26. Cement composition according to claim 25, in the form of a mortar, with an included air content up to 5% by volume.

27. Cement composition according to claim 26, in the form of a concrete, with an included air content up to 2% by volume.

28. Cement composition according to claim 16, which has a compression strength of at least 15 Mpa, measured 1 day after setting.

29. Cement composition according to claim 16, in the form of a mortar, with a compression strength of at least 40 Mpa, measured 7 days after setting, and of at least 50 Mpa, measured 28 days after setting.

30. Cement composition according to claim 16, in the form of a concrete, with a compression strength of at least 35 Mpa, measured 7 days after setting, and of at least 40 Mpa, measured 28 days after setting.

31. Process for the preparation of a cement composition containing; (i) a superfluidifying additive selected from the group consisting of an alkali metal, alkaline earth-metal and ammonium salt, of a sulfonated and oxidized product resulting from reacting sulfuric anhydride with fuel oil derived from steam cracking of oil products (FOKS), and (ii) an antifoam additive based on at least one copolymer of ethylene oxide and propylene oxide, comprising one or more ethylene oxide monomeric units comprising —(—CH$_2$CH$_2$—O—) units and one or more propylene oxide monomeric units selected from the group consisting of —(—CH(CH$_3$)CH$_2$—O—)— and —(—CH$_2$CH(CH$_3$)—O—)—, said copolymer further having: (a) an initial unit selected from the group consisting of R$_1$O—(—CH$_2$CH$_2$—O—)—; R$_1$O—(—CH(CH$_3$)CH$_2$—O—)— and R$_1$O—(—CH$_2$CH(CH$_3$)—O—)—, where R$_1$ is a linear or branched alkyl group having from 2 to 20 carbon atoms, and (b) a terminal unit selected from the group consisting of —(CH$_2$CH$_2$—O—)—H, —(CH(CH$_3$)CH$_2$—O—)—H, and —(—CH$_2$CH(CH$_3$)—O—)—H, (iii) water and (iv) cement, wherein the superfluidifying additive and the antifoam additive are added separately or in mixture form to the water and cement.

32. Composition as claimed in claim 31, wherein said mixture is an aqueous solution.

33. Process for the preparation of a cement composition containing: (i) a superfluidifying additive selected from the group consisting of an alkali metal, alkaline earth-metal and ammonium salt, of a sulfonated and oxidized product resulting from reacting sulfuric anhydride with fuel oil derived from steam cracking of oil products (FOKS), and (ii) an antifoam additive based on at least one copolymer of ethylene oxide and propylene oxide, comprising one or more ethylene oxide monomeric units comprising —(—$CH_2CH_2$—O—) units and one or more propylene oxide monomeric units selected from the group consisting of —(—$CH(CH_3)CH_2$—O—)— and —(—$CH_2CH(CH_3)$—O—)—, said copolymer further having: (a) an initial unit selected from the group consisting of $R_1$O—(—$CH_2CH_2$—O—)—; $R_1$O—(—$CH(CH_3)CH_2$—O—)— and $R_1$O—(—$CH_2CH(CH_3)$—O—)—, where $R_1$ is a linear or branched alkyl group having from 2 to 20 carbon atoms, and (b) a terminal unit selected from the group consisting of —($CH_2CH_2$—O—)—H, —($CH(CH_3)CH_2$—O—)—H, and —(—$CH_2CH(CH_3)$—O—)—H, (iii) water and (iv) cement, wherein the superfluidifying additive, the antifoam additive, and the water are added in mixture form to the cement.

* * * * *